Reissued Sept. 27, 1932

Re. 18,606

UNITED STATES PATENT OFFICE

RICHARD ERICSON, OF CHICAGO, ILLINOIS, ASSIGNOR TO UNITED STATES GYPSUM CO., OF CHICAGO, ILLINOIS, A CORPORATION OF ILLINOIS

LIGHT-WEIGHT CERAMIC MATERIAL AND PROCESS OF MAKING THE SAME

No Drawing. Original No. 1,702,076, dated February 12, 1929, Serial No. 226,259, filed October 14, 1927. Reissue No. 17,523, dated December 17, 1929, Serial No. 399,088, filed October 11, 1929. This application for reissue filed June 3, 1932. Serial No. 615,264.

This invention relates to a porous and light-weight cellular ceramic product, and a method for producing and manufacturing the same commercially.

One of the objects of the present invention is to produce a light-weight burned ceramic product, suitable for structural and other uses, consisting of a body of ceramic material having interspersed therein a very large number of substantially uniform voids so as to render the product highly cellular, this being accomplished by incorporating with a ceramic argillaceous earthy material, while in admixture with water, a foam sufficiently tenacious to maintain itself without breaking down during the shaping or casting of the material.

A further object of the invention is to mix argillaceous material that has previously been mixed with water with sufficient of a gaseous density-reducing agent or medium so as greatly to extend the same in volume, and to pour the resultant foamy mass into suitable molds in the presence of a substance capable of causing the mass to set up sufficiently rapidly to entrap, and to retain entrapped, the incorporated foam or gaseous density-reducing agent; then to dry the form thus produced, and subsequently to burn the same to form a hardened cellular ceramic product having substantially a foam-like structure.

A further object of the invention is to incorporate a tenacious foam with a clay slip and a reagent capable of causing the superficial setting up of the slip so as to entrap the bubbles of said foam to form an extended mass of ceramic material of a structure substantially like that of the foam added, and subsequently to dry and burn said mass to produce a cellular ceramic material of foam-like structure.

Other objects of the invention will appear from the description and claims hereinbelow.

The use of foam or other density-reducing substance in connection with cementitious materials to form porous cellular compositions when set and hardened to their final state with water, is becoming established as one commercial means of producing a light-weight material. I am not aware that anything of this principle has been applied to the production of ceramic materials where an argillaceous, earthy material is given a porous cellular structure by admixture with a tenacious foam-producing agent and subsequently this porous argillaceous material is heat-treated to render its cellular structure fixed in a finished ceramic product.

A comparatively light porous material suitable for structural purposes or suitable as a heat insulator can be made from clay or other argillaceous earthy material by first forming a plastic mixture of the earthy material with water, then mixing in a previously prepared tenacious foam or other density-reducing agent to uniform admixture, next forming the mass into a cast or shaped product of any desired form, then drying this cast to preserve its cell structure, and finally baking or burning this dried cast until a hardened mass results which retains permanently fixed the porous cellular structure afforded by the foam addition.

In carrying on my invention I can use the ordinary earthy materials such as clay, shale, etc. generally used as raw materials for producing ceramic products. Also these may be augmented with other special substance like flint, feldspar, "grog," etc. for specific properties as needed, either during some step in the manufacturing or in the final product. These raw materials are reduced to the desired state of fineness by suitable disintegrating or grinding means, and rendered plastic with water. However, in my process I reduce to perhaps a more fluidly plastic state than is the ordinary practice in the production of common ceramic products such as brick or tile. This is usually necessary because the addition of foam to provide the porous cellular structure has a bulking effect, and additional fluidity, in the plastic earthy material, is needed to take care of this and fully to preserve the foam from breaking down somewhat, as it does when the plastic mixture itself is too stiff. The material for forming the foam may consist of any number of materials capable of producing tenacious foam from a water solution such, for example, as soap bark, licorice, commercial plaster retarder, glue, soap, resin soap, and various admixtures of these, etc. The foam itself may be made by beating the water solution of these materials violently or by introducing a current of air into the solution with agitation, or by any other means of suitably producing such a foam. The greater the tenacity of the foam, the better is it applicable in carrying out the present invention.

In the production of light-weight shale brick, I take shale as used in the manufacture of ordinary brick and tile and grind it so that it can be readily mixed with water. Sufficient water is then mixed with it to form a plastic mass of such consistency or fluidity that foam can readily be mixed therewith. With certain shales I have used, this is about six-tenths of one part of water by weight to one part of ground shale. The foam used is made by dispersing air into a solution composed of three-quarters of one part of powdered soap bark suspended in one hundred parts of water, and this foam if properly prepared is very stable and preserves its structure for a long time. The quantity of foam used is about five parts of foam by volume to one part by volume of the shale and water mixture, and will give a resultant ceramic product having a density of about thirty pounds per cubic foot.

The mixture of shale, water and foam is then dried and after drying it is baked or burned at about the temperature and method used in burning the ordinary brick or tile products made from the same shale, care being taken not to fuse or melt the product during the burning or firing stage. After the burning, the hard porous product is ready for use in a variety of ways. If the original shape of the cast was a brick, this finished porous brick is then available as an insulating backing-up brick in high temperature insulation work. Or the burned product may be crushed and sized to form an aggregate for use together with a cementing material to yield a moulded and cast structure. One use of this crushed product is as a light-weight aggregate in the production of Portland cement concrete.

I have noticed in some cases where extremely light-weight products (25–30 pounds per cubic foot density) are desired that these foam clay casts when dried exhibit some cracking and shrinking. This, of course, depends somewhat on the nature of the clay or shale used as a base, and is what is ordinarily experienced in the general manufacture of ceramic products. But in my light-weight foam process, the natural tendency of the clay or shale in this direction is, of course, augmented, because after the foam addition the composite mix is less dense and consequently somewhat fragile. Thus, there is greater opportunity for shrinking and cracking during drying to manifest itself. If the finished ceramic products are to be used as crushed aggregates this of course is immaterial, but if the finished porous light-weight ceramic product is to be used intact itself for structural purposes and thus must retain the form and size in which it was cast, some additions must be made to the clay or shale to offset this shrinkage and cracking. The addition of silica, flint, "grog," and other coarser body materials is useful in this capacity.

I have also found that a mixture of calcined gypsum or plaster of Paris, which sets rapidly with water, will harden the cellular clay mass sufficiently to withstand the shrinking effect induced by subsequent drying. The calcined gypsum, mixed with water, may be added to the mixture of argillaceous material and foam with good results. Accelerating the set of the calcined gypsum decreases the time required before the subsequent mixture stiffens. However, when gypsum is used, more care must be taken in burning the dried porous product because usually the fusing or melting point of such a mixture is lowered by the addition of the gypsum.

Many modifications of this invention will suggest themselves and I do not wish to be limited in various applications of this principle, for the various modifications that suggest themselves do not depart from the spirit of this invention. Other types of argillaceous material other than the natural earthy materials used may suggest themselves such as built-up artificial refractory raw materials made plastic by only small additions of clays or shales; and many types of foam or other density-reducing agents with greater or less stability than the soap bark foam cited may be used. Also other methods of drying and burning may be used than merely preparing unit casts, and then drying and burning the same. For example, the casts may be partially dried and then placed in a rotary kiln where they can be further dried and burned in one operation, if the material is intended for use primarily as an aggregate.

Having thus described my invention, what I claim is:

1. A porous ceramic material comprising the burned product resulting from heat-treating a mixture of foam and argillaceous material.

2. A porous light-weight ceramic product comprising burned argillaceous material made porous by foam addition while plastic.

3. A light-weight structural material comprising the burned product resulting from heat-treating argillaceous material in which a tenacious foam is incorporated prior to drying and burning.

4. A porous light-weight material comprising the burned product resulting from heat-treating a mixture of argillaceous substance, tenacious foam, and substances adapted to prevent excessive shrinking and cracking during drying.

5. A light-weight ceramic material comprising the burned product resulting from heat-treating a mixture of argillaceous material, foam, calcined gypsum, and water.

6. A porous ceramic material comprising the burned product resulting from heat-treating a mixture of one part by volume of a plastic mixture of argillaceous material and water, with five parts of tenacious foam.

7. A cellular ceramic product comprising the burned product resulting from heat-treating a mixture of one part by volume of a plastic mix of argillaceous material and water, four parts of tenacious foam, and one-third part of calcined gypsum.

8. The process of manufacturing a porous product comprising forming a fluid plastic mixture of finely divided argillaceous material with water, incorporating therein a tenacious foam, shaping and drying this admixture and finally heat-treating the dried porous mass to obtain a substantially hardened cellular product.

9. The process of manufacturing a porous ceramic material comprising the incorporation of tenacious foam into a fluid plastic mixture of argillaceous substance and water, the foam volume being in excess of the volume of argillaceous water mixture used, casting this resultant mixture into desired shape, drying, and finally burning the dried porous mass at a temperature below its fusion point to maintain its porous structure throughout the burning process.

10. The process of manufacturing a porous ceramic product comprising adding to a plastic mixture of argillaceous substance, foam and water, calcined gypsum to prevent shrinkage during subsequent moisture loss, drying this composite mass, and finally heat-treating the dried porous mass at a temperature below its fusion point to yield a hardened porous product.

11. A light-weight structural material comprising the burned product resulting from heat-treating argillaceous material in which a density-reducing agent is incorporated prior to drying and burning.

12. A porous light-weight material comprising the burned product resulting from heat-treating a mixture of argillaceous substance, a density-reducing agent, and substances adapted to prevent excessive shrinking and cracking during drying.

13. A light-weight ceramic material comprising the burned product resulting from heat-treating a mixture of argillaceous material, a density-reducing agent and calcined gypsum.

14. The process of manufacturing a porous product comprising forming a fluid plastic mixture of finely divided argillaceous material with water, incorporating therein a density-reducing agent, shaping and drying this admixture, and finally heat-treating the dry porous mass to obtain a substantially hardened cellular product.

15. The process of manufacturing a porous ceramic product, comprising adding to a plastic mixture of argillaceous substance, a density-reducing agent and water and calcined gypsum to prevent shrinkage during subsequent moisture loss, drying this composite mixture, and finally heat-treating the dry porous mass at a temperature below its fusion point to yield a hardened, porous product.

16. The process of producing a light-weight burned ceramic product which comprises mixing an argillaceous material with water to form a slip, adding a substance thereto to cause the slip to assume a cellular structure, adding substances thereto capable of preventing shrinking and drying thereof, shaping the slip into form, and drying and burning the said form.

17. The process of producing a light-weight burned ceramic product which comprises mixing an argillaceous material with water, rendering the resulting mixture cellular by the incorporation of gaseous bubbles therewith, adding a reagent to said treated mixture to prevent collapse and shrinkage of the mixture, shaping and drying the same, and burning the dried product.

18. The process of producing a light-weight burned ceramic product which comprises mixing an argillaceous material with water, rendering the resulting mixture cellular by the incorporation of gaseous bubbles therewith, adding calcium sulphate to the thus treated mixture, shaping the mixture into form, and drying and burning said form.

19. The process of manufacturing a cellular ceramic product which comprises forming a plastic mixture of an argillaceous substance and water, incorporating air bubbles therewith, adding calcium sulphate to prevent shrinkage during subsequent loss of moisture from the thus produced foamy mass, foaming said mass into shape, drying the shaped mass, and burning the same at a temperature below its fusion point to yield a hardened product.

20. A porous light-weight material comprising the burned product resulting from heat-treating a mixture of argillaceous materials, a gaseous density-reducing agent, and substances adapted to prevent excessive shrinking and cracking during the drying.

21. A light-weight ceramic material comprising the burned product resulting from heat-treating a mixture of argillaceous material, a gaseous density-reducing agent, and gypsum.

22. A porous light-weight ceramic product consisting of argillaceous material and calcium sulphate, having a foam-like cellular structure.

23. A porous light-weight ceramic product consisting of argillaceous material, and a substance capable of preventing the shrinking and cracking thereof, the product being characterized by having a foam-like cellular structure.

24. A light-weight ceramic product containing argillaceous material, a substance adapted to prevent shrinking and cracking thereof, and permanently fixed voids in foam-like formation.

25. A light-weight ceramic product containing argillaceous material, calcium sulphate, and permanently fixed voids in foam-like formation.

In witness whereof, I have hereunto subscribed my name this 28th day of May, 1932.

RICHARD ERICSON.